United States Patent [19]

Takayama et al.

[11] Patent Number: 4,802,554
[45] Date of Patent: Feb. 7, 1989

[54] GREASE APPLYING METHOD

[75] Inventors: Naoto Takayama; Yuzo Tsunekawa; Kazumi Kitamura, all of Kanagawa, Japan

[73] Assignee: Fuji Photo Film Co., Ltd., Kanagawa, Japan

[21] Appl. No.: 142,593

[22] Filed: Jan. 11, 1988

[30] Foreign Application Priority Data

Jan. 9, 1987 [JP] Japan ................................. 62-2659

[51] Int. Cl.⁴ .............................................. F16N 7/00
[52] U.S. Cl. ..................................... 184/14; 118/243; 118/263; 366/231
[58] Field of Search ................... 184/6.14, 14, 16, 19, 184/22, 25, 61, 102, 103.1, 109, 6; 118/243, 263; 366/230, 231

[56] References Cited

U.S. PATENT DOCUMENTS 3,952,697  4/1976  Bonfoske ........................... 118/263
4,147,232  4/1979  Gaunt et al. ....................... 184/109

FOREIGN PATENT DOCUMENTS 0187194  10/1984  Japan ................................. 184/14

Primary Examiner—Leonard E. Smith
Assistant Examiner—Leonard P. Walnoha
Attorney, Agent, or Firm—Sughrure, Mion, Zinn, Macpeak, and Seas

[57] ABSTRACT

In a method of applying a precisely measured quantity of grease to a desired part, the grease is stored and leveled in an open grease storing container at all times, and a grease applying pin is dipped into the grease through its surface and pulled out of the grease and then moved so that the grease on the grease applying pin is applied to the desired part, whereby the grease is maintained high in quality and the quantity of grease applied does not fluctuate.

8 Claims, 2 Drawing Sheets

GREASE APPLYING METHOD

BACKGROUND OF THE INVENTION

The present invention relates to a method of applying grease to smooth the mechanical operations of members at their contact region. More particularly, the invention relates to a method of applying grease in measured amounts, the components of the grease being separable.

Various methods of providing a lubricant such as grease to the contact region of mechanical members, such as in a sliding region or bearing region of mechanical members, have been employed in a variety of industrial fields. Grease is, in general, highly viscosity, and it is rather difficult to apply precisely measured quantities of grease to desired parts.

One conventional method for applying measured quantities of grease is carried out with the apparatus shown in FIG. 1.

The apparatus shown in FIG. 1 uses a closed system to automatically supply precisely measured quantities of grease at predetermined time intervals. The apparatus is used, for instance, to apply grease to the shaft of a roller for guiding the magnetic tape in a magnetic tape cassette.

The apparatus of FIG. 1 employs a closed system in which a grease applying head 30 operated by an air cylinder 40 is connected through a grease supplying pipe 38 to a grease tank 39 storing grease 20. The grease applying head 30 includes a large diameter part 31, a plunger 32 movable in the large diameter part 31, a pushing pin 33 positioned at the end of the plunger 32, and a grease applying nozzle 37 extending from the outer cylindrical wall of the large diameter part 37. When the air cylinder 40 is operated, the grease applying head is suitably operated with the aid of stoppers 41 and 42 so that a precisely measured quantity of grease is automatically dispensed.

The operation of the apparatus shown in FIG. 1 will be described in more detail. The grease applying head 30 is moved, in its entirely, by the air cylinder 40. In this operation, the large diameter part 31 is stopped by the first stopper 41 when the grease applying head 30 has moved a predetermined distance, while the plunger 32 continues to move. As the plunger 32 moves forwardly in this manner, the pushing pin 33 at the end of the plunger 32 enters a grease pool 34, being pushed by the second stopper 42. In this operation, a communication port 35, through which the grease supplying pipe 38 and the grease pool 34 are communicated with each other, remains closed because the plunger 32 is shifted from the large diameter part 31, whereas the grease pool 34 is communicated with the grease applying nozzle 37 through another communication port 36.

Therefore, as the pushing pin 33 enters the grease pool, a suitable quantity of grease 20 is discharged through the grease applying nozzle 37 and applied to a supporting shaft 14. Thereafter, the grease applying head 30 is moved backwardly (in the direction of an arrow Y) by the air cylinder 40, thus receiving grease from the grease tank 39.

The above-described operations are repeatedly carried out. The operation of the grease applying head 30 is started in response to a signal which is produced when, for instance, a conveying device such as a pallet reaches a predetermined position. The grease 20 is delivered from the grease tank 39 under an air pressure of the order of 4 kg/cm$^2$.

Heretofore, in the case where it was required to repeatedly supply a predetermined amount of high-viscosity grease to a predetermined position with high accuracy, an apparatus for applying or injecting the grease with the above-described closed system of relatively complex construction has been extensively employed. However, the apparatus suffers from the following difficulties:

When the grease 20 is initially charged into the grease tank 39 or the grease tank 39 refilled, air unavoidably enters the closed system, which should be completely filled with the grease 20. In order to eliminate this difficulty, a valve 43 is connected to the grease supplying system to remove the air-mixed grease from the closed system. However, it is considerably difficulty to completely remove the air-mixed grease. Therefore, when the air remaining in the system is supplied into the plunger 32, the quantity of grease 20 discharged from the grease applying nozzle 37 fluctuates.

The grease 20 may contains, for instance, "LUBRI-PLAT Aero" (trade name). In this and some other types of grease, the components are separable; i.e., the solid components are separable from the oil components. In such a case, the components can separate in the closed system, and hence the grease is applied in a separated state. Such grease cannot function properly. Also, sometimes the oil components can leak from the closed system and adhere to the lower half 13 of the cassette.

Since the grease 20 is always viscous to some extent, some tends to collect on the end of the grease applying nozzle 37. Especially in the case where the above-described grease applying method is employed, grease can gradually accumulate, on the end of the nozzle. A blob of the grease thus accumulated may be transferred at once to the area to be lubricated. That is, the quantity of grease applied is not stable.

SUMMARY OF THE INVENTION

Accordingly, an object of the present invention is to eliminate the above-described difficulties accompanying a conventional grease applying method.

More specifically, an object of the invention is to provide a grease applying method in which the grease is prevented from being separated into components, and the grease can be applied at a precisely measured rate and with high stability over long periods of time.

The foregoing object and other objects of the invention have been achieved by the provision of a grease applying method in which precisely measured quantities of grease are automatically applied to a desired part, and in which, according to the invention, the grease is held in grease storing means of an open system and stirred and leveled at all times; and grease applying means is dipped into the grease through its surface, pulled out of the grease, and then moved so that the grease adhering to the grease applying means is applied to the desired part.

The nature, principle and utility of the invention will become more apparent from the following detailed description when read in conjunction with the accompanying drawings.

DESCRIPTION OF THE PREFERRED EMBODIMENTS

Figure 1:
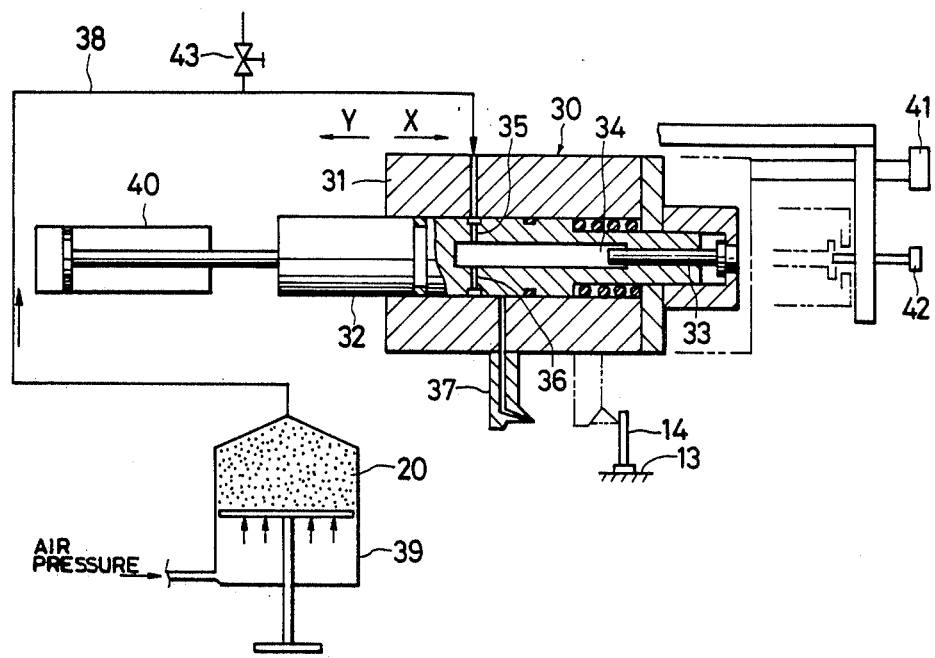
FIG. 1 is an explanatory diagram showing a conventional grease applying apparatus.
Figure 2:
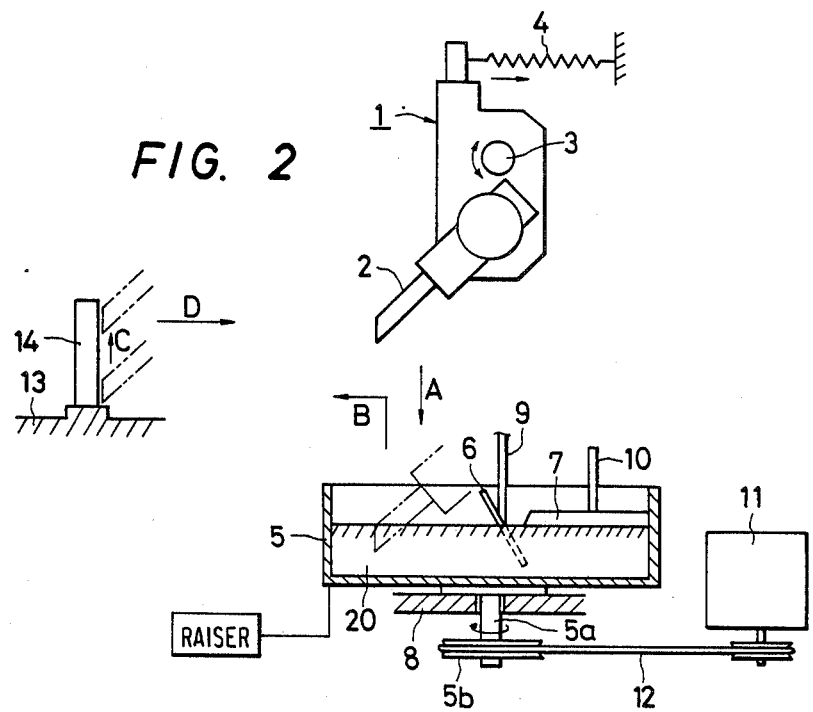
FIG. 2 is an explanatory diagram showing the arrangement of an example of a grease applying apparatus practicing a grease applying method according to the invention.
Figure 3:
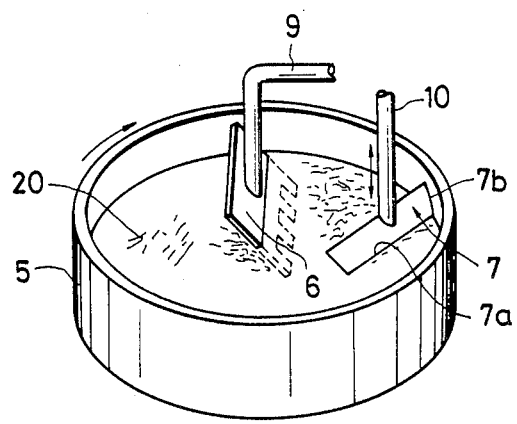
FIG. 3 is a perspective view of a grease pan shown in FIG. 2.
Figure 4:
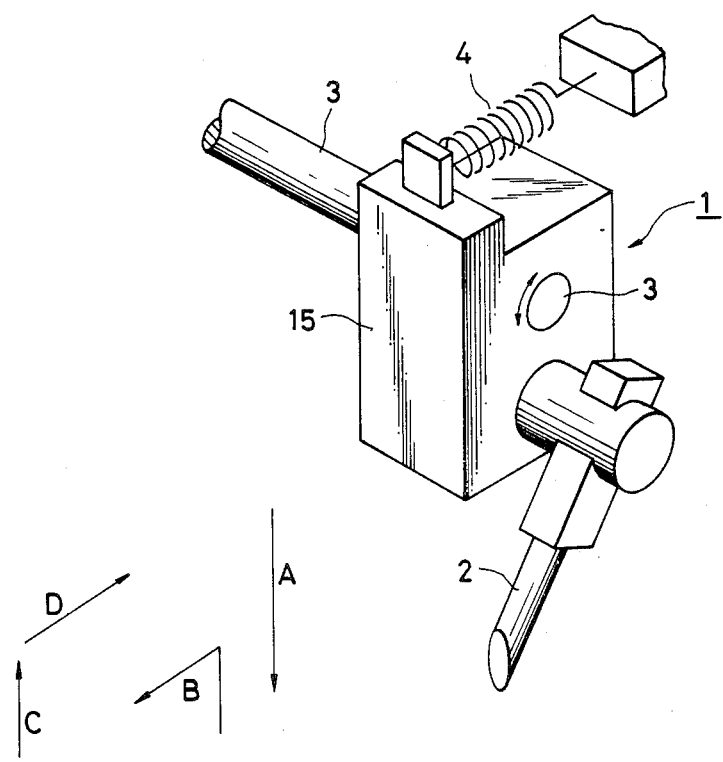
FIG. 4 is a perspective view of a grease applying head shown in FIG. 2.

An example of a grease applying method according to the invention will be described with reference to FIGS. 2 through 4 showing a grease applying apparatus which practices the method of the invention.

As shown in FIGS. 2 and 3, the grease applying apparatus uses a grease applying head 1 to apply grease 20 from a grease pan 5 to a supporting shaft 14 (for a roller to guide a magnetic tape) on the lower half 13 of a magnetic tape cassette.

The grease pan 5 for storing the grease 20 is designed so as to rotate with the grease contained therein. More specifically, a rotary shaft 5a extends from the bottom of the grease pan 5, and an endless belt 12 is laid over a pulley mounted on the rotary shaft 5a and the output shaft of an electric motor 11 so that the drive force of the latter 11 is transmitted through the belt 12 to the rotary shaft 5a. The rotary shaft 5a of the grease pan 5 is rotatably supported on a suitable stand 8.

A stirring member 6 for stirring the grease and a smoothing member 7 for smoothing the surface of the grease are provided in the grease pan 5. The stirring member 6 is, for instance, in the form of a flat plate. The stirring member 6 extends near the bottom of the grease pan 5 and has cuts at appropriate positions so that it can effectively stir the grease 20 when the grease pan 5 is turned. Furthermore, the stirring member 6 is fixedly held, for instance, by a holder 9 so that the stirring member is suitably inclined with respect to the rotation of the grease pan 5. The smoothing member 7 is in the form of a flat plate having a straight lower edge 7a. The smoothing member 7 is held and inclined, for instance, by a holder 10 so that the lower edge 7a contacts the surface of the grease 20 and its side edge 7b is in linear contact with the inner wall of the grease pan 5. The smoothing member 7 is held in contact with the surface of grease 20 so as to smooth it, and it is fixed in position by means of holder 10. Although the smoothing member 7 and the stirring member 6 are fixedly positioned as described above, the grease pan is lifted as the amount of the grease decreases so that the level of the top of the grease is maintained unchanged, and hence the amount of grease dipped by an applying pin (described below) is maintained unchanged. The smoothing member 7 may be modified so that it can be moved vertically in correspondence to the quantity of grease 20 in the grease pan.

The grease applying head 1 is operated, for instance, by a pickup-and-place unit to apply grease 20 from the grease pan 5 to the supporting shaft 14. The structure of the grease applying head is shown in FIG. 4. A head body 15 is connected, for instance, through an arm 3 to the pickup-and-place unit. A greasing applying pin 2 is coupled to the head body 15 in such a manner that it extends obliquely downwardly. The head body 15 is mounted on the arm 3 in such a manner that it is rotatable around the arm 3 and is fixed to the arm 3, and it is urged clockwise in FIG. 4 by a tension spring 4. The grease applying head 1 is located above the grease pan 5.

The grease applying head 1 is moved in synchronization with the conveyance of a lower half on a pallet or the like. This will be described in more detail. First, the head 1 is moved toward the grease pan 5 (in the direction of an arrow A) until the grease applying pin 2 enters the grease 20 in the pan 5 so that some of the grease 20 adheres to the end portion of the pin 2. In this connection, it should be noted that the pin 2 dips into the surface of the grease 20 after it has been made flat with the smoothing member 7. Thereafter, the head 1 is moved upwardly to a position near the base of the supporting shaft 14, and is then moved towards the supporting shaft 14 (as indicated by an arrow B). After the head is moved until the grease applying pin 2 is brought into contact with the supporting shaft 14, the head is moved upwardly for a predetermined distance with the pin 2 held in contact with the supporting shaft 14 so that the grease 20 is applied to the shaft 14 (in the direction of an arrow C). In this operation, the pin 2 is suitably abutted against the shaft 14 by means of the tension spring 4, and therefore the grease 20 is positively applied to the shaft 14. Thereafter, the head 1 is moved upwardly along the shaft 14, and is then moved away from the shaft 14 (as indicated by an arrow D). Finally, the head is moved to its standby position (original position). The above-described movements of the grease applying head are carried out for each of the lower halves 13 which are conveyed one after another, to apply the grease to the supporting shaft.

In the above-described embodiment, only one grease applying head is employed. However, the technical concept of the invention is applicable to the case where a plurality of grease applying heads are employed. Furthermore, the above-described embodiment can be modified in various other manners. For instance, the method of driving the grease pan 5, and the configurations and numbers of the stirring member 6 and the smoothing member 7 and the structures used for holding the members 6 and 7 can be changed without departing from the invention.

The amount of grease 20 applied changes varies with the configuration of the end portion of the grease applying pin 2, the material of the pin 2, the angle of inclination of the pin 2, the degree at which the pin 2 enters the grease 20, the period of time for which the pin 2 is in contact with the supporting pin 14, and the viscosity of the grease 20. Therefore, the amount of grease 20 applied can be changed by controlling these conditions.

With the above-described apparatus, the grease applying operation can be satisfactorily achieved. Specifically, in the case where the grease 20 in the grease pan 5 is of the "LUBRIPLAT" type, its dropping point is about 180° C., its density is 325, it is still viscous at extremely low temperatures, and it can be used over a wide range of temperatures. However, if it is allowed to stand for a long period, the solid components are liable to separate from the oil components. On the other hand, in the invention, because the grease is stirred by the stirring member 6 at all times while the surface of the grease is smoothed by the smoothing member 7 so that at least the surface into which the grease applying pin 2 is dipped is held flat at all times, the grease adhering to the grease applying pin 20 is maintained unchanged in quality, and a desired predetermined amount of grease is applied at all times. Furthermore, in the apparatus of the invention, since the grease storing system and the grease supplying system are open, the grease can be readily exchanged or supplemented. In addition, the apparatus can easily be maintained and adjusted, thus ensuring a satisfactory grease applying operation.

As described above, in the grease applying method of the invention, the grease is stirred and leveled in the open grease storing apparatus at all times, and the grease is applied with the grease applying pin so that a precisely controlled measured quantity of grease is applied to a desired part. Therefore, the grease is free from the difficulty of the solid components separating from the oil components; that is, the grease is maintained in an excellent quality. Furthermore, the quantity of grease adhering to the grease applying element is made constant. Thus, a precisely controlled measured quantity of grease of high quality can be positively applied to a desire part.

While preferred embodiments of the invention have been described, it should be noted that the invention is not limited thereto or thereby, and that various changes and modifications can be made without departing from the invention.

What is claimed:

1. A grease applying method in which a precisely measured quantity of grease is applied to a desired part, comprising the steps of:
    placing a supply of grease in an open storing means;
    continuously stirring and leveling the grease in said storing means;
    dipping grease applying means into said grease through the surface thereof;
    pulling said applying means with grease adhered to at least an end portion thereof; and
    moving said applying means to a part to be lubricated to apply grease adhered to said applying means to said part.

2. The grease applying method of claim 1, wherein said step of continuously stirring and leveling said grease comprises providing a stationary stirring member extending into said grease and a stationary leveling member at a top level of said grease, and rotating said grease storing means.

3. The grease applying method of claim 2, wherein said grease stirring member comprises a flat plate.

4. The grease applying method of claim 3, wherein said stirring member extends near a bottom of said grease storing means and has cuts formed therein.

5. The grease applying method of claim 4, wherein said stirring member is inclined relative to a rotary axis of said grease storing means.

6. The grease applying method of claim 5, wherein said leveling member comprises an inclined plate having a linear surface in contact with a surface of said grease.

7. The grease applying method of claim 6, further comprising the step of raising said grease storing means as said grease is consumed to maintain said top level of said grease at a level of said linear surface of said leveling member.

8. The grease applying method of claim 2, wherein said grease applying means comprises a grease applying head having an obliquely inclined grease applying pin coupled thereto.

* * * * *